Jan. 31, 1950  C. S. BAKER  2,495,998
SEED LIFTER AND HOPPER ARRANGEMENT FOR PLANTERS
Filed April 12, 1945
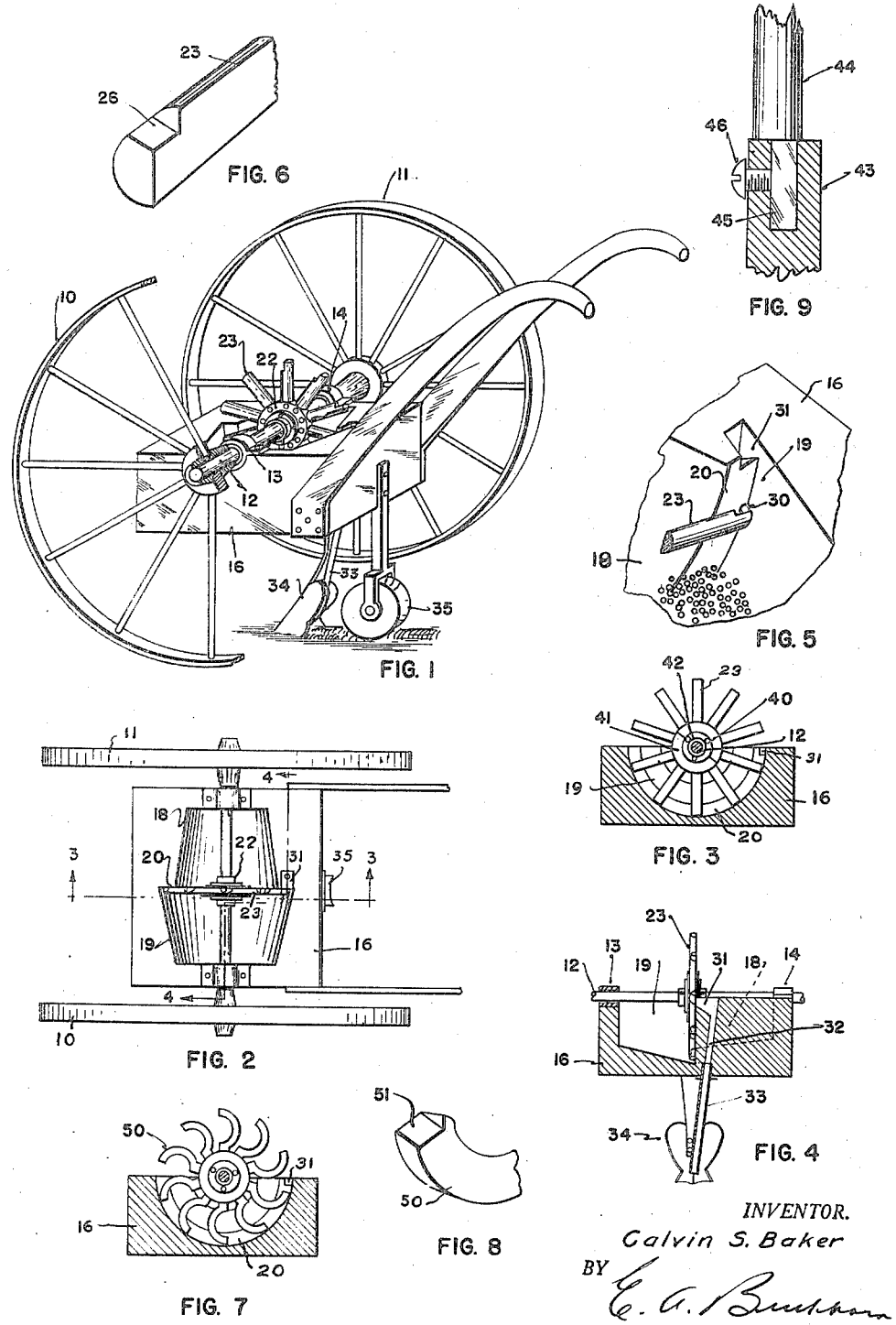
INVENTOR.
Calvin S. Baker
BY
ATTORNEY Patented Jan. 31, 1950

2,495,998

UNITED STATES PATENT OFFICE 2,495,998

SEED LIFTER AND HOPPER ARRANGEMENT FOR PLANTERS

Calvin S. Baker, Portland, Oreg.

Application April 12, 1945, Serial No. 587,915

5 Claims. (Cl. 222—177)

The present invention relates to new and useful improvements in seed planting machines.

Seed planters have been devised heretofore but none of these are suitable for planting vegetable seeds such as peas, beets, onions and the like because of the numerous inherent disadvantages therein. Most seed planters heretofore developed have the common characteristic of dropping a plurality of seeds at a time with the result that the plants must later be thinned out in order that the remaining plants may properly develop. The thinning operation requires much manual labor and, because of the seasonal and extremely tiresome nature of the work, laborers are difficult to procure and the crop production cost is unduly high. In order to reduce the number of seeds dropped in conventional seed planters the apertures in the selector plates have been reduced in size but such procedure results in the cracking or grinding of an excessively large proportion of the seeds.

It is an object of the present invention, therefore, to provide a new and improved seed planter which is particularly characterized by the fact that it is adapted for dropping one seed at a time in a predetermined spaced relation from previously planted seeds.

It is a further object of the present invention to provide a new and improved seed planter which comprises relatively few working parts, simple to operate and which may be manufactured at relatively low cost.

More specifically, it is an object of the present invention to provide a new and improved seed planter whereby one seed is picked up at a time and lifted from the remaining seeds in a hopper and dropped into a discharge chute and planted in a predetermined spaced relation from previously planted seeds.

In accordance with an illustrated embodiment, the seed planter is comprised of a hopper mounted on a shaft extending between a pair of supporting wheels and also a seed lifter element mounted on the shaft and rotatable therewith in vertical plane extending into the hopper. The seed lifter element is so constructed and arranged whereby upon rotation through the supply of seeds in the hopper one seed is picked up at a time and thereby carried upwardly in the hopper to a point above the level of the remaining seeds and dropped into a discharge chute which conveys the seeds into the furrow.

Additional objects and advantages of the invention will be made apparent by the following description taken in connection with the accompanying drawings while the features of novelty characterizing the invention will be pointed out with greater particularity in the appended claims.

In the drawings Fig. 1 is a view in perspective illustrating the invention according to one embodiment thereof; Fig. 2 is a plan view of the planter shown in Fig. 1; Fig. 3 is a view taken along the line 3—3 of Fig. 2; Fig. 4 is a view taken along the line 4—4 of Fig. 2; Fig. 5 is a fragmentary perspective view illustrating certain operative features of the invention; Fig. 6 is an enlarged view in perspective illustrating one detail of the invention; Fig. 7 is a view corresponding to Fig. 3 but illustrating a further modification of the invention; Fig. 8 is an enlarged fragmentary view illustrating a detail of the modification of Fig. 7; and Fig. 9 is an enlarged fragmentary view illustrating a still further modification of the invention.

Referring first to Fig. 1 the seed planter of the invention comprises a pair of supporting wheels 10 and 11 secured upon opposite ends of a common shaft 12. Rotatably supported upon the shaft 12 by means of bearings 13 and 14 is a rectangular body member 16 which depends beneath the shaft 12 in a substantially horizontal relation as shown. The body member 16 is recessed or hollowed from the upper surface to form a hopper for receiving a quantity of seeds to be planted. As shown more clearly in the views of Figs. 2 and 3 the recess is defined by two portions 18 and 19 the bottom walls of which are concentric with the shaft 12 and are conically tapered and slope downwardly toward the center. The inner end of the recess portion 19 is of greater diameter than the adjacent end of the recess portion 18 with a vertical shoulder 20 formed therebetween which shoulder extends concentrically in a radial plane about the shaft 12.

The shoulder 20 constitutes a plane wall extending at right angles, or radially of the axis of shaft 12. The bottom wall 19 of the hopper is curved concentrically with the shaft axis and which curved wall intersects with the plane of the wall portion or shoulder 20 to define a sharp internal corner therewith and which corner is also concentric with the shaft axis.

Secured to the shaft 12 is a circular seed lifting element comprising a hub 22 provided with a plurality of radially extending spokes 23 of such length that they fit relatively closely into the corner between the wall of the recess 19 and the shoulder 20 as illustrated more clearly in the sectional views of Figs. 3 and 4. The surfaces of the spokes 23 next adjacent the shoulder 20 are preferably flat and rotate relatively closely thereto. The outermost end of each of the spokes 23, as shown more clearly in the detailed view of Fig. 6, is provided with a notch 26, the lower surface of which slopes inwardly toward the shoulder 20 to define a small wedge-shaped pocket therewith. The portion of the curved recessed wall 19 immediately adjacent the shoulder wall 20 forms the end wall for this pocket. The size of this pocket is just sufficient to receive and retain a single seed therein.

It will be obvious that as the spokes 23 are rotated through the hopper containing a quantity of seeds, one seed will be picked up within the notch 26 in the outermost end of each of the spokes 23 as illustrated at 30 in the diagrammatic view of Fig. 5. The spokes 23 are preferably rounded on the side opposite the shoulder 20 in order that seeds will not be picked up by the upper edges thereof but only in the notches 26. Because of the fact that the lower surface of the notch slopes toward the shoulder 20 the seeds 30 will bear against the surface of the shoulder 20 and also against the adjacent wall of the recess 19 where it meets the shoulder 20. Seeds lifted in the notches 26 and carried upwardly against the shoulder 20 are dropped into an opening 31 in the uppermost end of the shoulder 20 above the level of seeds in the hopper and from which they are conveyed through a passage 32 extending through the body member 16 and into a conveyor tube 33 which extends downwardly to a point behind the plow 34 for depositing the seed into the furrow formed thereby. Arranged behind the plow 34 is a suitable wheel 35 for closing the furrow and covering the seeds planted therein. By reference to the view of Fig. 5 it will readily be apparent that as the spokes 23 pass across the opening 31 in the shoulder 20 the seed 30 carried upwardly in the notch 26 will drop automatically into the passage 32.

It will be understood that the size of the notches 26 formed in the ends of the spokes 23 will be determined by the size of the seeds to be planted by the machine. Hub and spoke units having different sizes of notches for use in planting different sizes of seeds may be provided and which may be used interchangeably with the planting device. If preferred the hubs may be made in two sections such as 40 and 41 as shown in Fig. 3 and which may be assembled on opposite sides of the shaft 12 and secured between opposite flange plates 42 provided on the shaft 12. If desired the hub may be formed in a single piece with the spokes removably attached thereto as illustrated in Fig. 9. As shown in Fig. 9, the part 43 illustrates a rim section of a solid hub corresponding to the hub 22 and a spoke unit 44 similar to the spokes 23, provided with a root 45 fitting into a cooperating radial opening in the hub 43 and adapted to be secured therein by a set screw 46.

A further modification of the invention is illustrated in Figs. 7 and 8 and which differs from the forms previously described in that the seed lifting unit comprises a hub having a plurality of radially extending arms 50 which are of a hook shape, the outermost ends of which are provided with seed lifting notches 51 similar to those previously described in connection with the spokes 23. An advantage of the hook-shaped arms resides in the fact that they tend less to whip the seeds contained within the hopper into the air in the event that the planter is moved along at a rapid rate such as behind a tractor. The hook-shaped seed lifting arms 50 shown in the present modification tend to slice through the seeds with considerably less agitation than the straight, spoke-like arms.

From the description of the invention as given, it will be apparent that the present invention in its broad aspect consists of a hopper for containing a quantity of seeds and with means for dipping into the hopper and lifting one seed at a time therefrom and for depositing such seeds individually into a chute which drops them into the furrow. The seed lifting means as shown is comprised of a circular element rotatable in a vertical plane and having a plurality of notches in an outer arc of such size as to accommodate but a single seed at a time and which, when lifted above the surface of the remaining seeds in the hopper, is discharged into the planting chute.

The seed planter as described comprises relatively few working parts subject to wear while, at the same time, there are no parts of intricate or expensive design with the result that it is inherently capable of relatively inexpensive manufacture.

Attention is also directed to the fact that in the operation of the present planter seeds will not be cracked or ground up as in the case of many different types of planters heretofore developed. The clearance between the rotating seed lifter element and the perpendicular shoulder 20 formed in the hopper is made sufficiently close to eliminate any possibility of seeds becoming wedged therebetween. However, it will not be necessary for the ends of the radial seed lifter arms to frictionally engage the shoulder 20 to cause wear of the adjacent surface.

By virtue of the conically tapering surfaces defining the bottom of the hopper portions 18 and 19 both portions of which slope toward the center, the seeds tend normally to gravitate to the lowermost portion, that is, into the corner at the bottom of the shoulder 20 and into the path of the ends of the seed lifting arms. It will be obvious that the hopper portion 18 is not essential to the present invention but is provided for the mere purpose of increasing the hopper capacity of the machine.

An appropriate spacing of the seeds planted may readily be obtained simply by increasing or decreasing the number of spokes of the seed lifter element. By dividing the peripheral length of the supporting wheels 10—11 by the number of spokes of the seed lifter element the spacing of the seeds can readily be calculated. Either by use of a seed lifter element having individually removable spokes or by use of removable and interchangeable spoke assemblies the desired number, and hence spacing of the seeds, may be selected in accordance with the optimum requirements of the particular variety of crop to be planted.

While the invention has been described with particular reference to certain preferred embodiments, it will readily be understood by those skilled in the art that the invention is not necessarily limited to the details shown and that these may be varied considerably without departing from the spirit and scope of the invention.

What I claim is:

1. A seed planter comprising a hopper for containing a quantity of seeds, a circular lifter element rotatable about a horizontal axis extending above the level of seeds contained in said hopper, said hopper including a curved bottom wall and a plane wall extending at right angles to the axis of said element, said curved wall intersecting said plane wall forming a corner concentric with said axis, the periphery of said element fitting cooperatively and snugly against said curved wall immediately adjacent said corner, the radial surface portion of said element immediately adjacent the periphery thereof fitting cooperatively and snugly against said plane wall immediately adjacent said corner a plurality of angularly spaced notches in the periphery of said element, said notches forming pockets in said corner and adapted for lifting one seed at a time from said quantity contained in said hopper, means defining a discharge chute having an open upper end above the level of said quantity of seeds and immediately adjacent said corner, the bottom of said notches in said element sloping toward said chute whereby seeds lifted by said element automatically drop into said chute as said notches of said element move past the open upper end thereof.

2. A seed planter comprising a hopper for containing a quantity of seeds, a circular seed lifter element rotatable about a horizontal axis normally extending above the level of said seeds, a plane wall portiton of said hopper extending at right angles with the axis of said element, a curved wall portion of said hopper concentric with said axis intersecting said plane wall portion to form an internal corner therewith concentric with said axis, the radius of said element corresponding substantially to the radius of said corner, said element being rotatable in a closely fitting relation adjacent said plane wall portion with the periphery of said element fitting cooperatively and snugly against said curved wall immediately adjacent said corner, a plurality of angularly spaced notches in the periphery of said element, said notches having lower surfaces sloping toward said corner and each defining a small pocket with said plane and curved wall portions in said corner whereby, upon rotation of said element, seeds are carried upwardly from said quantity by said notches in said corner, an opening provided immediately adjacent said corner in the radial path of travel of said notches whereby, upon movement of said notches past said opening, the seed lifted by each of said notches is dropped into said opening, and means for conveying seeds from said opening toward the ground.

3. A seed planter comprising a pair of spaced apart supporting wheels, a shaft secured to and extending between said wheels, means defining a hopper for containing a quantity of seeds supported in a depending relation from said shaft, a circular seed lifter element secured to said shaft and rotatable within said hopper, the lower portion of said element adapted to depend within a quantity of seeds contained in said hopper, said hopper including intersecting plane and curved wall portions defining an internal corner concentric with said shaft, the radius of said circular seed lifter element being just slightly less than the radius of said corner, the periphery of said seed lifter element being rotatable in a closely fitting relation within said corner, the periphery of said element fitting cooperatively and snugly against said curved wall portion immediately adjacent said corner a plurality of uniformly angularly spaced notches provided in the periphery of said element, the bottom surface of said notches sloping toward one of said hopper wall portions defining said corner and each forming a wedge-shaped pocket with said wall portions in said corner, an opening in said one wall portion above the level of seeds in said hopper and in the path of travel of said notches whereby seeds lifted by said notches are discharged through said opening, and a chute for conveying seeds from said opening toward the ground.

4. A seed planting device comprising a hopper for containing a quantity of seeds, a seed lifter element rotatable about a horizontal axis extending above the level of seeds in said hopper, said hopper including a curved bottom wall and a plane wall intersecting with each other to form an internal corner in said hopper concentric with the axis, the periphery of said element rotatable closely adjacent both of said wall portions in said corner, the periphery of said element fitting cooperatively and snugly against said curved wall immediately adjacent said corner, notches in the outermost edge of said element each defining a relatively small pocket with both of said wall portions in said corner for lifting one seed at a time from said quantity and a discharge chute having a seed receiving opening in one of said wall portions immediately adjacent said corner above the level of seeds in said hopper.

5. A seed planter comprising a pair of wheels mounted upon a common axle, at least one of said wheels being secured to said axle, means defining a hopper supported by and depending from said axle between said wheels, said hopper being semicircular in cross section and adapted for contaning a quantity of seeds, a circular seed lifter element secured to said axle and rotatable therewith, said hopper including a semicircularly curved wall portion and a plane wall portion defining a sharp internal corner within said hopper, said plane wall portion extending at right angles to said axle and said corner being concentric with said axle, said seed lifter element being rotatable closely adjacent said plane wall and the periphery of said element fitting cooperatively and snugly against said curved wall portion immediately adjacent said corner, notches in the periphery of said element each defining a small pocket with the plane and curved wall portions immediately adjacent said corner, said notches being adapted for lifting one seed at a time from the bottom of said hopper and for conveying the same upwardly to a point substantially in horizontal alignment with said axle adjacent the upper edge of said hopper, and a discharge chute having an opening in said plane wall immediately adjacent said corner.

CALVIN S. BAKER.

REFERENCES CITED

The following references are of record in the file of this patent:

UNITED STATES PATENTS

| Number | Name | Date |
| --- | --- | --- |
| 460,880 | Montecino | Oct. 6, 1891 |
| 523,226 | Moore | July 17, 1894 |
| 559,892 | Hayes | May 12, 1896 |
| 1,095,136 | Bahner | Apr. 28, 1914 |
| 1,161,369 | Ayers | Nov. 23, 1915 |